(12) United States Patent
McCrossen et al.

(10) Patent No.: US 10,162,369 B2
(45) Date of Patent: Dec. 25, 2018

(54) LIQUID LEVEL CONTROL MODULE AND APPARATUS COMPRISING SAME

(71) Applicant: Liberty Pumps, Inc., Bergen, NY (US)

(72) Inventors: Timothy D. McCrossen, Rochester, NY (US); David M. Williams, Attica, NY (US)

(73) Assignee: Liberty Pumps, Inc., Bergen, NY (US)

( * ) Notice: Subject to any disclaimer, the term of this patent is extended or adjusted under 35 U.S.C. 154(b) by 203 days.

(21) Appl. No.: 15/206,236

(22) Filed: Jul. 9, 2016

(65) Prior Publication Data
US 2018/0011498 A1    Jan. 11, 2018

(51) Int. Cl.
| | | |
|---|---|---|
| *H01H 36/00* | (2006.01) | |
| *H01H 36/02* | (2006.01) | |
| *G05D 9/12* | (2006.01) | |
| *G01F 23/68* | (2006.01) | |
| *G01F 23/70* | (2006.01) | |
| *G01F 23/74* | (2006.01) | |
| *G05D 9/04* | (2006.01) | |

(52) U.S. Cl.
CPC .............. *G05D 9/12* (2013.01); *G01F 23/683* (2013.01); *G01F 23/703* (2013.01); *G01F 23/74* (2013.01); *G05D 9/04* (2013.01); *H01H 36/0006* (2013.01); *H01H 36/02* (2013.01); *Y10T 137/7323* (2015.04); *Y10T 137/7326* (2015.04); *Y10T 137/7358* (2015.04); *Y10T 137/7423* (2015.04)

(58) Field of Classification Search
CPC ........ G01F 23/68; G01F 23/683; G01F 23/70; G01F 23/703; G01F 23/74; H01H 36/02; H01H 36/0006; G05D 9/12; Y10T 137/7287; Y10T 137/7358; Y10T 137/7404; Y10T 137/7413; Y10T 137/7423; Y10T 137/729; Y10T 137/7319; Y10T 137/7323; Y10T 137/7326; Y10T 137/7361
See application file for complete search history.

(56) References Cited

U.S. PATENT DOCUMENTS 3,714,823 A * 2/1973 Wilkens .................... G01F 3/38
137/391
3,992,941 A * 11/1976 McGoldrick ........... G01F 23/68
73/313

(Continued)

*Primary Examiner* — Reinaldo Sanchez-Medina
*Assistant Examiner* — Hailey K Do
(74) *Attorney, Agent, or Firm* — John M. Hammond; Patent Innovations LLC

(57) ABSTRACT

A liquid level control module comprising an elongated tubular housing immersible through a surface of a liquid and into a bulk volume of the liquid, and first, second, and third electrical switches, and first and second floats movable along the tubular housing. The first electrical switch is disposed within a lower portion of the tubular housing, the second electrical switch is disposed within an intermediate portion of the tubular housing, and the third electrical switch is disposed within an upper portion of the tubular housing. Each of the switches has an open state and a closed state. Motion of the first float relative to the first switch changes its state. Motion of the second float relative to the second switch changes its state, and motion of the second float relative to the third switch changes its state. Thus a two-float module may provide three level control signals.

14 Claims, 4 Drawing Sheets

(56) References Cited

U.S. PATENT DOCUMENTS

| | | | | |
|---|---|---|---|---|
| 4,605,038 | A * | 8/1986 | Tchitdjian | F16K 21/185 137/399 |
| 4,708,674 | A * | 11/1987 | Matsumoto | F01M 11/065 123/196 R |
| 4,766,860 | A * | 8/1988 | Abe | F01M 11/10 123/196 A |
| 5,103,673 | A * | 4/1992 | Sawada | G01F 23/74 73/311 |
| 8,892,263 | B1 * | 11/2014 | Morris | F04D 15/0218 417/36 |
| 8,992,694 | B2 * | 3/2015 | Gnadinger | A47L 15/0047 134/56 D |
| 9,417,635 | B2 * | 8/2016 | Hampton | G01F 23/265 |
| 2015/0090342 | A1 * | 4/2015 | Cartwright | G05D 9/12 137/2 |

* cited by examiner

LIQUID LEVEL CONTROL MODULE AND APPARATUS COMPRISING SAME

BACKGROUND

Technical Field

Devices for monitoring and controlling liquid level in a vessel.

Description of Related Art

Liquid level sensors and electrical switches that are actuated by a change in liquid level are often used in processes in which the level of liquid in a vessel or other container (man-made or occurring in nature) must be controlled. Multiple levels of the liquid must often be detected for various purposes. The principle of buoyancy may be used to monitor liquid level, in which an object is provided having a lower specific gravity than the liquid being monitored. The object floats on the surface of the liquid, and thus the vertical position of the object moves as a result of any change in liquid level. The vertical position of the object can be detected by various means. For example, the object may contain a magnet, and detection of the magnetic field of the object may be detected. Such detection may be used to change the state of an electrical switch from open to closed, or from closed to open. An electrical switch operating under this principle is commonly referred to as "float switch." A float switch that uses magnetism may be constructed as a reed switch.

In general, for simple liquid level detection, one float is provided for each liquid level to be detected. In confined vessel spaces in which multiple liquid levels must be monitored, this may cause a problem, in that the various level floats require too much room for operation. Thus a compact multi-level liquid level monitoring and control device is needed.

SUMMARY

The present invention meets this need by providing a liquid level control module comprising an elongated tubular housing immersible through a surface of a liquid and into a bulk volume of the liquid, and first, second, and third electrical switches, and first and second floats movable along the tubular housing. The first electrical switch is disposed within a lower portion of the tubular housing, the second electrical switch is disposed within an intermediate portion of the tubular housing, and the third electrical switch is disposed within an upper portion of the tubular housing. Each of the switches has an open state and a closed state.

The first float is movable along the tubular housing, such that variation of the level of the surface of the liquid past the first electrical switch causes motion of the first float past the first electrical switch and causes a change in state between the open state and the closed state of the first electrical switch. The second float is movable along the tubular housing, such that variation of the level of the surface of the liquid past the second electrical switch causes motion of the second float past the second electrical switch and causes a change in state between the open state and the closed state of the second electrical switch. Further variation of the level of the surface of the liquid past the third electrical switch causes motion of the second float past the third electrical switch and causes a change in state between the open state and the closed state of the third electrical switch. The relative motion of the floats is upward when the liquid level is rising and downward when the liquid level is falling. In both instances, the changes in state of the respective switches are achieved.

In certain embodiments, the first electrical switch is operable by a magnetic force caused by motion of the first float past the first electric switch, the second electrical switch is operable by a magnetic force caused by motion of the second float past the second electric switch, and the third electrical switch is operable by a magnetic force caused by motion of the second float past the third electric switch. In such embodiments, the first, second, and third electrical switches may be reed switches; and each of the first and second floats may contain a magnet.

In accordance with the present disclosure, there is also provided an apparatus for controlling liquid level in a vessel. The apparatus comprises a liquid discharge device in communication with a volume of liquid contained in the vessel, which is operable to discharge from the volume of liquid contained in the vessel to an exterior of the vessel; and the liquid level control module as recited above. In operation of the apparatus, movement of the first float to a level above the first electrical switch and movement of the second float to a level above the second electrical switch causes the liquid discharge device to discharge liquid from the vessel. Subsequently, movement of the second float to a level below the second electrical switch and movement of the first float to a level below the first electrical switch causes the liquid discharge device to cease discharging liquid from the vessel. Movement of the second float to a level above the third electrical switch causes operation of the high level actuated device. The liquid discharge device may be a pump, or a control valve. The high level actuated device may be an alarm device, such as an audible device, a light device, a vibratory device, a display device, or combinations thereof.

BRIEF DESCRIPTION OF THE DRAWINGS

The present disclosure will be provided with reference to the following drawings, in which like numerals refer to like elements, and in which.

Figure 1A:
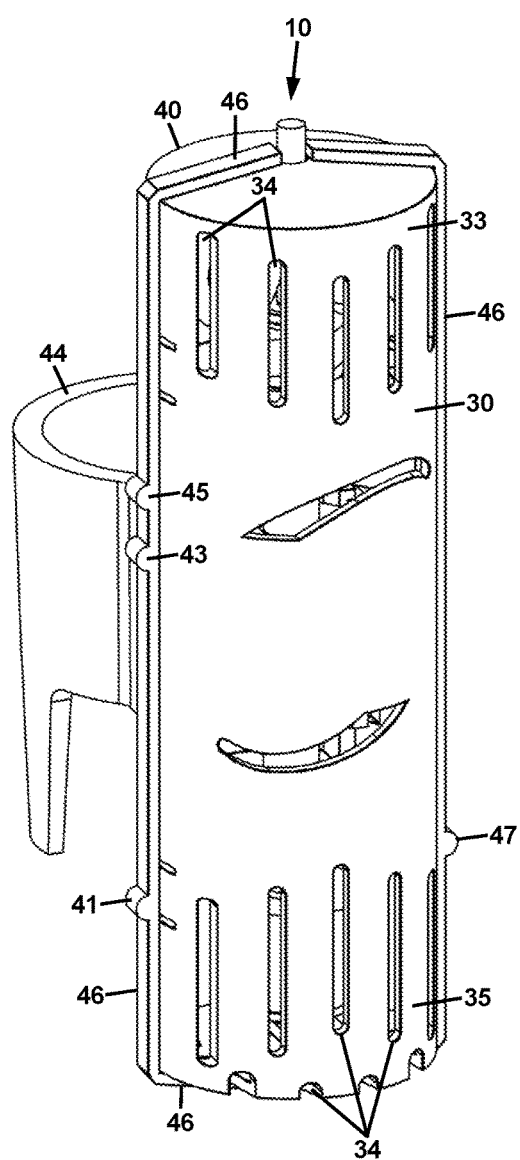
FIG. 1A is a front left perspective view of a liquid level control module of the present disclosure.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary. It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

Figure 1B:
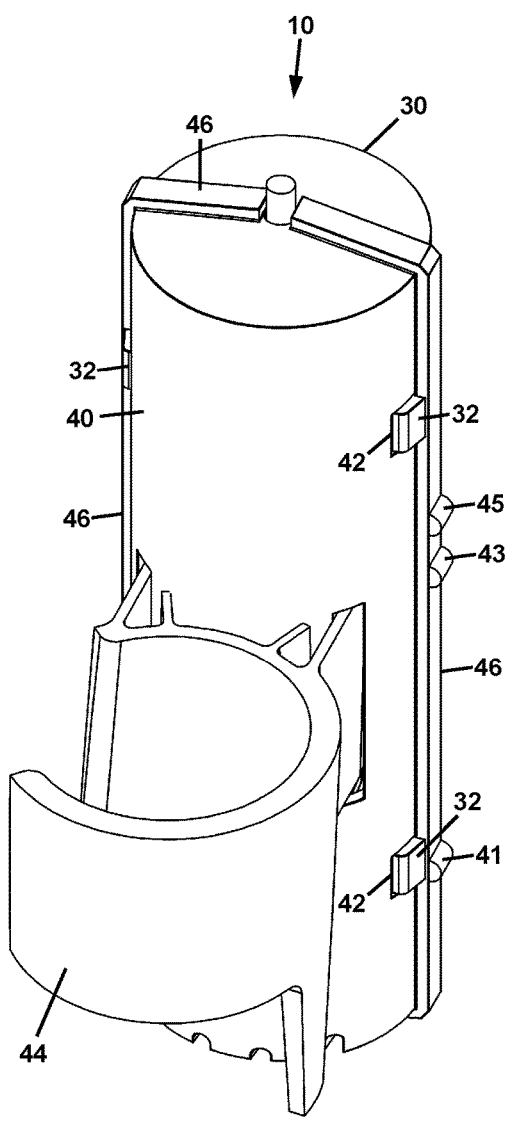
FIG. 1B is a rear left perspective view of the liquid level control module of FIG. 1A.
Figure 2:
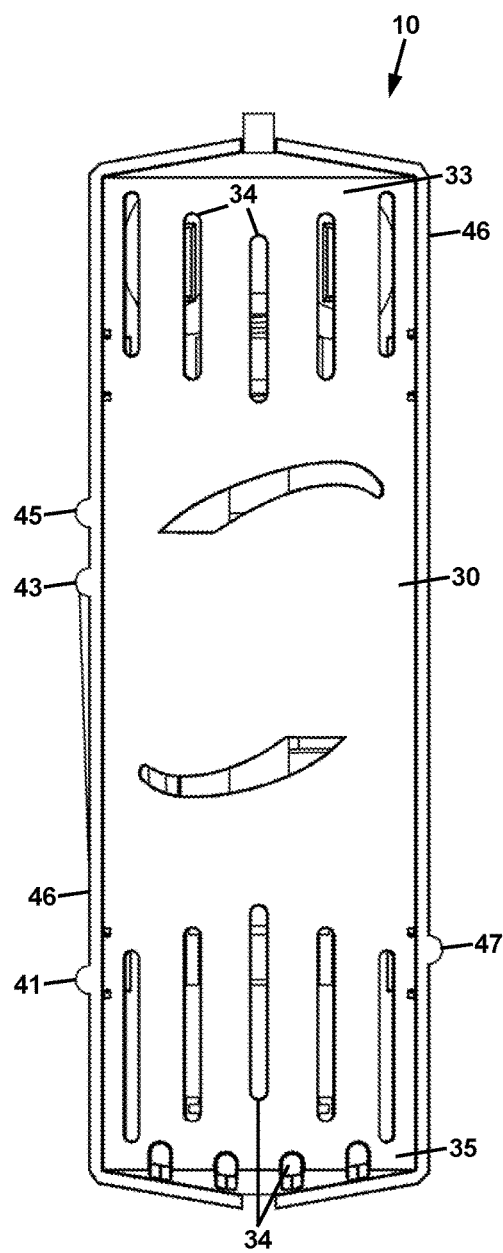
FIG. 2 is a front elevation view of the liquid level control module of FIG. 1A.

Referring first to FIGS. 1A, 1B, and 2, a liquid level control module 10 is depicted, and in particular, an external housing 20 of the module 10. The external housing 20 is comprised of a front portion 30 and a back portion 40. The front portion 30 is removably joined to the back portion 40 to form the hollow external housing 20 contain level sensing and/or switching components to be described subsequently herein. The joining of front housing portion 30 to back housing portion 40 may be accomplished by providing mating snap tabs 32 that are integrally formed as part of front housing portion 30, and that engage with corresponding ports 42 formed in back housing portion 40. Other fasteners for removably joining front housing portion 30 to back housing portion 40 are contemplated.

The front housing portion 30 includes venting ports 34 at the upper region 33 and lower region 35 to enable liquid to flood the interior of housing 20 when the module 10 is immersed in a liquid. The back housing portion 40 includes a snap sleeve extension 44 that may be used to fasten and locate the module 10 by a snap fit on a riser pipe (not shown) that is used to deliver or remove liquid from a vessel 110 (FIG. 4) within which the level of liquid is to be controlled. The back housing portion 40 may also include a peripheral flange 46 formed on the front edge thereof.

Figure 3:
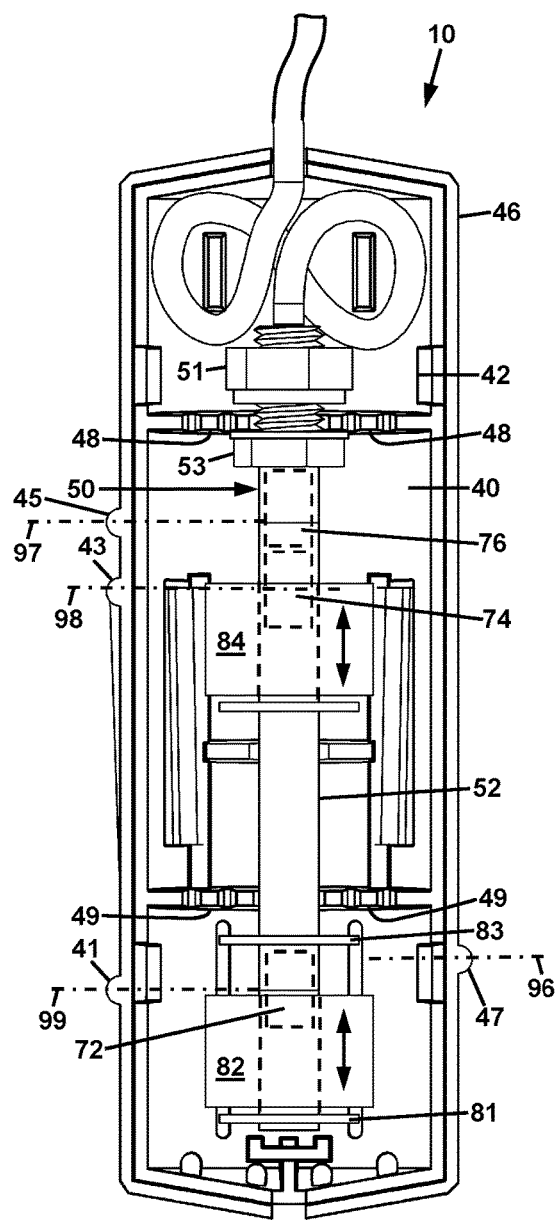
FIG. 3 is a front elevation view of the liquid level control module of FIG. 1A, but with a front cover removed to show internal structure.
Figure 4:
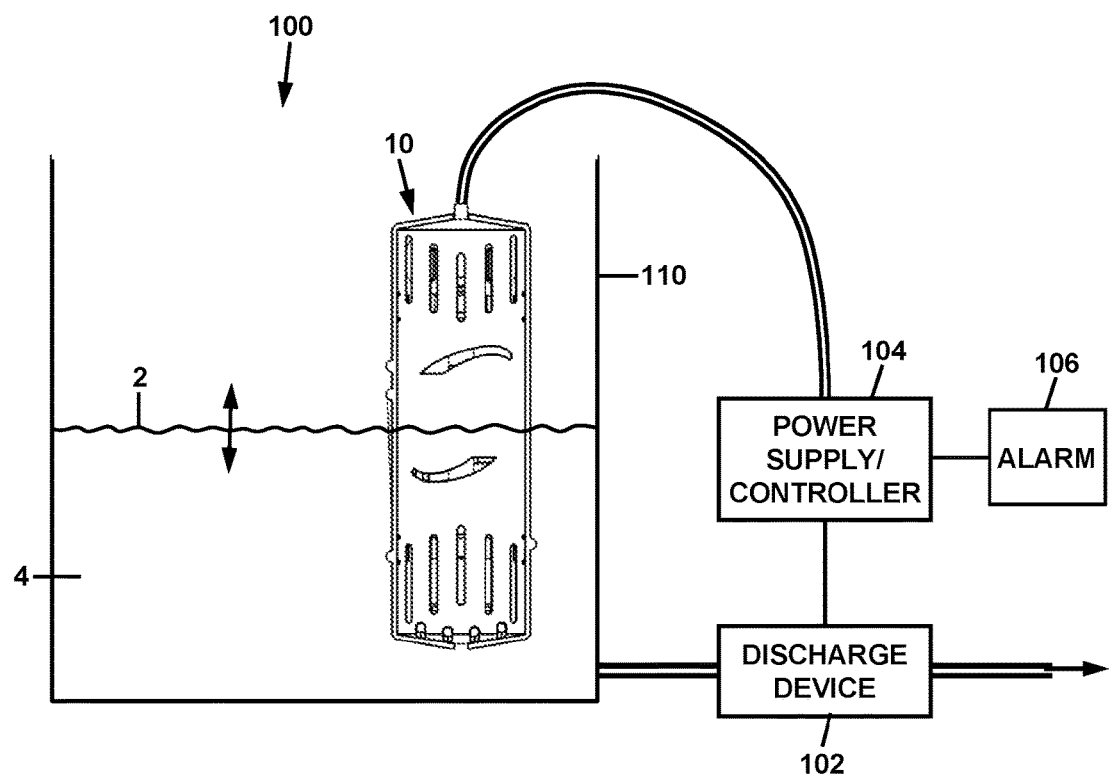
FIG. 4 is a schematic view of an apparatus for controlling liquid level in a vessel, the apparatus including the liquid level control module of FIGS. 1-3.

Turning now to FIG. 3 and FIG. 4, certain liquid level control components of the module 10, and the use of the module 10 in controlling liquid level, respectively, are depicted. The module 10 is further comprised of a control assembly 50 contained within the housing 20. The control assembly 50 is comprised of an elongated tubular housing 52 immersible through a surface 2 of a liquid and into a bulk volume 4 of the liquid, and first, second, and third electrical switches 72, 74, and 76, and first and second floats 82 and 84 movable along the tubular housing 52. The elongated tubular housing 52 may be joined to the rear housing portion 40 by a pair of clamping nuts 51 and 53, which engage with an upper cross-flange 48 formed in the rear housing portion 40. A lower cross-flange 49 may be provided to receive the lower region of the tubular housing and locate it concentrically within the external housing 20.

The first electrical switch 72 is disposed within a lower portion of the elongated tubular housing 52, the second electrical switch 74 is disposed within an intermediate portion of the elongated tubular housing 52, and the third electrical switch 76 is disposed within an upper portion of the elongated tubular housing 52. Each of the switches 72, 74, and 76 has an open state and a closed state.

The first float 82 is movable along the tubular housing, such that variation of the level of the surface 2 of the liquid past the first electrical switch 72 causes motion of the first float 82 past the first electrical switch 72 and causes a change in state between the open state and the closed state of the first electrical switch 72. In certain embodiments, the "trigger" level of liquid indicated by dotted line 99, which is the level at which the first electrical switch 72 changes state may be denoted by a bump 41, or other indicium formed in the flange 46 of the rear housing portion 40. In that manner, the proper observation of the operation of the switch 72 can be performed by a user of the control module 10 without having the front housing portion 30 removed. The first electrical switch 72 changes state whenever the liquid level rises up from below trigger level 99 to above trigger level 99, and vice-versa. The first float 82 may also be provided with lower and upper stops 81 and 83 to limit its travel along the elongated tubular housing 52.

It is noted that the housing 20 is capable of being fitted with an alternative control assembly (not shown) that includes a lower switch at an alternative vertical location with a trigger level indicated by dotted line 96. In such an embodiment, the rear housing portion 40 may be provided with a bump 47 at the location of the trigger level 96. The alternative control assembly may be comprised of a single switch and float. If the alternative control assembly is comprised of multiple switches, the rear housing portion 40 may be provided with additional bumps (not shown) corresponding the respective trigger levels of the switches.

The second float 84 is movable along the elongated tubular housing 52, such that variation of the level of the surface 2 of the liquid past the second electrical switch 74 causes motion of the second float 84 past the second electrical switch 74 and causes a change in state between the open state and the closed state of the second electrical switch 74. The "trigger" level of liquid indicated by dotted line 98, which is the level at which the second electrical switch 74 changes state may be denoted by a bump 43, or other indicium formed in the flange 46 of the rear housing portion 40. The second electrical switch 74 changes state whenever the liquid level rises up from below trigger level 98 to above trigger level 98, and vice-versa.

Further variation of the level of the surface 2 of the liquid past the third electrical switch 76 causes motion of the second float 84 past the third electrical switch 76 and causes a change in state between the open state and the closed state of the third electrical switch 76. The "trigger" level of liquid indicated by dotted line 97, which is the level at which the third electrical switch 76 changes state may be denoted by a bump 45, or other indicium formed in the flange 46 of the rear housing portion 40. The third electrical switch 74 changes state whenever the liquid level rises up from below trigger level 97 to above trigger level 97, and vice-versa.

It is noted that the relative motion of the floats 82 and 84 is upward when the liquid level is rising and downward when the liquid level is falling. In both instances, the changes in state of the respective switches are achieved. The switches may be "normally open", i.e. in an open state when the liquid level and therefore the respective floats are below them, and closed when the liquid level and respective floats are above them. Alternatively, the switches may be "normally closed", i.e. in a closed state when the liquid level and therefore the respective floats are below them, and open when the liquid level and respective floats are above them.

It is also to be understood that as used herein, the "surface" of a liquid may be an air-water interface, or another gas-liquid interface, or a liquid-liquid interface formed by two immiscible liquids of different specific gravity, such that one liquid "floats" upon the other liquid. The operative requirement is that the floats 82 and 84 of the module 10 are chosen with a specific gravity less than the lower liquid, and greater that the upper liquid or gas above the lower liquid surface 2 or interface, such that the floats will rise and fall with the changing level of the lower liquid surface 2 or interface.

In certain embodiments, the first electrical switch 72 is operable by a magnetic force caused by motion of the first float 82 past the first electric switch 72, the second electrical switch 74 is operable by a magnetic force caused by motion of the second float 84 past the second electric switch 74, and the third electrical switch 76 is operable by a magnetic force caused by motion of the second float 84 past the third electric switch 76. In such embodiments, the first, second, and third electrical switches 72, 74, and 76 may be reed switches; and each of the first and second floats 82 and 84 may contain a magnet that actuates the switches, i.e., changes their state. In certain embodiments as depicted in FIG. 3, the floats 82 and 84 may be annular floats that surround the elongated tubular housing 52.

Referring now to FIG. 4, as well as FIGS. 2 and 3, an apparatus 100 for controlling liquid level in a vessel is depicted. The apparatus 100 comprises a liquid discharge device 102 in communication with a volume 4 of liquid contained in the vessel 110 via a conduit 104. The liquid discharge device is operable to discharge from the volume 4 of liquid contained in the vessel 110 to an exterior of the vessel 100. The apparatus 10 is further comprised of a liquid level control module 10 as recited above. The apparatus 100 may further include a power supply and/or process control computer 104 that receives liquid level signals from the level control module 10, and operates the discharge device 102 accordingly. The discharge device may be a pump, or a control valve, which may be useful in a "gravity drain" and/or "gravity feed" application.

It is to be understood that FIG. 4 is a schematic illustration, and is not drawn to scale. Additionally, as used herein, the term "vessel" is to be construed as including a tank, tub, vat, barrel, or any other man-made container, as well as containers occurring in nature, for which there is a need to control liquid level therein.

Figure 5:
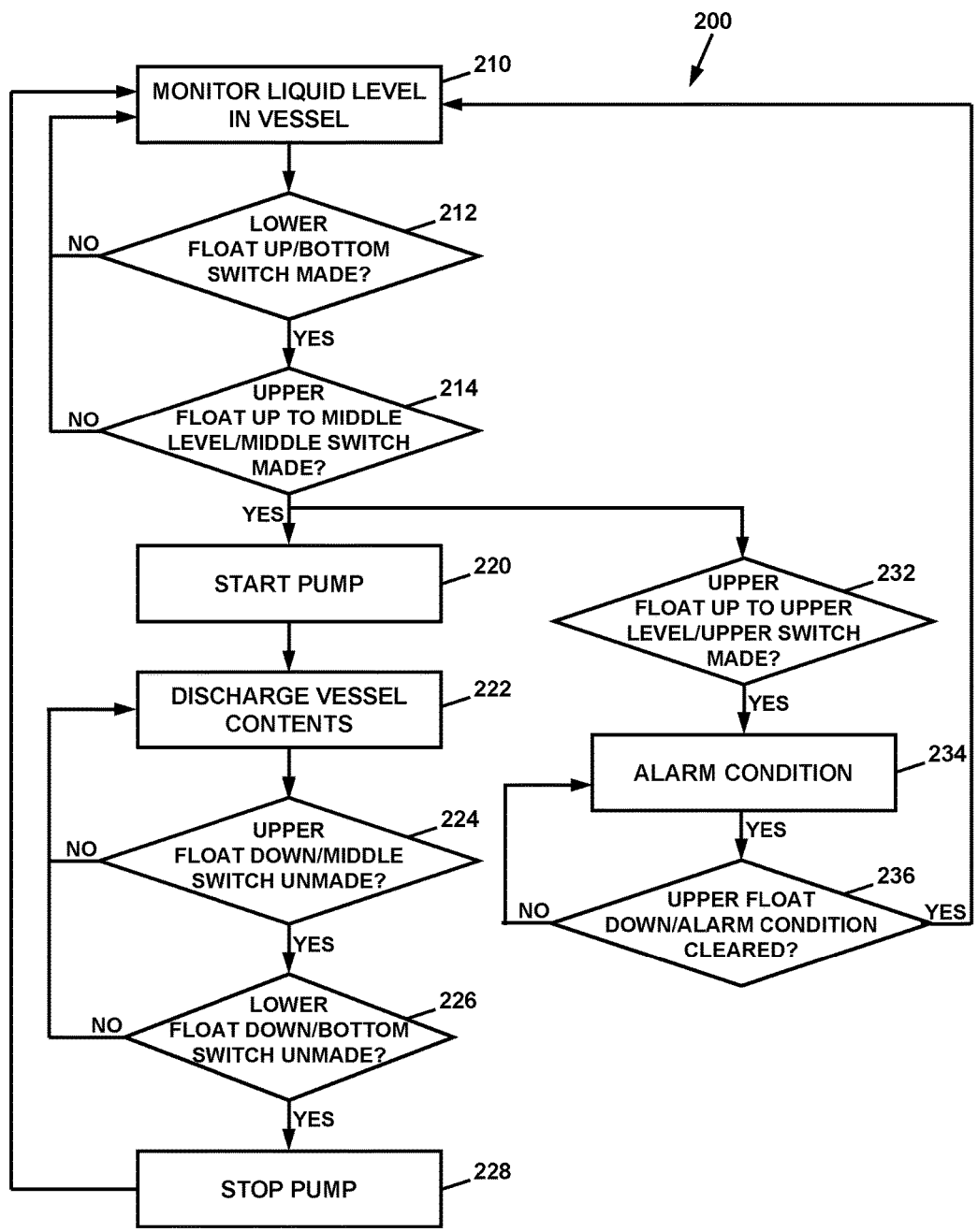
FIG. 5 is a logic diagram that is descriptive of the operation of the apparatus of FIG. 4.

FIG. 5 is a logic diagram that is descriptive of the operation of the apparatus of FIG. 4, and a method 200 of controlling liquid level in a vessel using the apparatus. In operation of the apparatus 100, the liquid level control module 10 is monitoring 210 the liquid level in the vessel. Via the module 10, the status of the first/lower float 82 and first/bottom electrical switch 72 is checked 212. If the first/bottom electrical switch 72 is "made," i.e. if the liquid level 2 has risen above trigger level 99, then the status of the second/upper float 82 and second/middle electrical switch 74 is checked 214. If the second/middle electrical switch 74 is "made," i.e. if the liquid level 2 has risen above trigger level 98, then the pump or other liquid discharge device 102 is started/actuated 220. In summary, movement of the first float 82 to a level above the first electrical switch 72 and movement of the second float 84 to a level above the second electrical switch 84 causes the liquid discharge device to discharge 222 some of the liquid from the vessel 110.

Accordingly, provided that the liquid discharge device 102 is operating and is removing liquid from the vessel faster than any incoming liquid source (not shown), the level of the liquid in the vessel will decrease. Monitoring of the liquid level in the vessel by the control module 10 continues. Via the module 10, the status of the second/upper float 82 and second/middle electrical switch 74 is checked 224. If the second/middle electrical switch 74 is "unmade," i.e. if the liquid level 2 has fallen below trigger level 98, then the status of the first/lower float 82 and first/bottom electrical switch 72 is checked 226. If the first/bottom electrical switch 72 is "unmade," i.e. if the liquid level 2 has fallen below trigger level 99, then the pump or other liquid discharge device 102 is stopped 228. In summary, movement of the second float 84 to a level below the second electrical switch 74 and movement of the first float 82 to a level below the second electrical switch 82 causes the liquid discharge device to stop the discharge of liquid from the vessel 110.

Referring again to FIG. 5, via the module 10, the status of the second/upper float 82 and third/top electrical switch 76 is checked 232. If the third/top electrical switch 76 is "made," i.e. if the liquid level 2 has risen above trigger level 97, then a high level actuated device 106 is actuated due to alarm condition 234. The high level actuated device 106 may be an alarm device, such as an audible device, a light device, a vibratory device, a display device, or combinations thereof. The status of the second/upper float 82 and third/top electrical switch 76 continue to be checked 236. If the third/top electrical switch 76 is "unmade," i.e. if the liquid level 2 has fallen below trigger level 97, then the alarm condition is cleared.

It is therefore apparent that there has been provided, in accordance with the present disclosure, A liquid level control module, and an apparatus for controlling liquid level in a vessel. The foregoing description of technology and the invention is merely exemplary in nature of the subject matter, manufacture, and use of the invention and is not intended to limit the scope, application, or uses of any specific invention claimed in this application or in such other applications as may be filed claiming priority to this application, or patents issuing therefrom.

Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

What is claimed is:

1. A liquid level control module comprising:
   a) an external housing immersible through a surface of a liquid and into a bulk volume of the liquid, and comprised of a wall including first, second, and third indicia located on an exterior surface of the wall, and a passageway providing liquid communication between an interior of the external housing and an exterior of the external housing;
   b) an elongated tubular housing contained within the external housing;
   c) a first electrical switch disposed within a lower portion of the tubular housing, a second electrical switch disposed within an intermediate portion of the tubular housing, and a third electrical switch disposed within an upper portion of the tubular housing, each of the first, second, and third switches having an open state and a closed state;
   d) a first float movable along the tubular housing, wherein variation of a level of the surface of the liquid past the first electrical switch causes motion of the first float past the first electrical switch and causes a change in state between the open state and the closed state of the first electrical switch, and wherein the location of the first indicium is at the level of the surface of the liquid causing the change in state of the first electrical switch;

e) a second float movable along the tubular housing, wherein variation of the level of the surface of the liquid past the second electrical switch causes motion of the second float past the second electrical switch and causes a change in state between the open state and the closed state of the second electrical switch, and wherein the location of the second indicium is at the level of the surface of the liquid causing the change in state of the second electrical switch, and further variation of the level of the surface of the liquid past the third electrical switch causes motion of the second float past the third electrical switch and causes a change in state between the open state and the closed state of the third electrical switch, and wherein the location of the third indicium is at the level of the surface of the liquid causing the change in state of the third electrical switch.

2. The module of claim 1, wherein the first electrical switch is operable by a magnetic force caused by motion of the first float past the first electric switch, the second electrical switch is operable by a magnetic force caused by motion of the second float past the second electric switch, and the third electrical switch is operable by a magnetic force caused by motion of the second float past the third electric switch.

3. The module of claim 2, wherein the first, second, and third electrical switches are reed switches.

4. The module of claim 3, wherein the first and second floats each contain a magnet.

5. An apparatus for controlling liquid level in a vessel, the apparatus comprising:
  a) a liquid discharge device in communication with a volume of liquid contained in the vessel, the liquid discharge device operable to discharge from the volume of liquid contained in the vessel to an exterior of the vessel;
  b) a liquid level control module comprising:
    an external housing immersible through a surface of the liquid and into the volume of the liquid, and comprised of a wall including first, second, and third indicia located on an exterior surface of the wall, and a passageway providing liquid communication between an interior of the external housing and an exterior of the external housing;
    an elongated tubular housing contained within the external housing;
    a first electrical switch disposed within a lower portion of the tubular housing and in electrical communication with the liquid discharge device, a second electrical switch disposed within an intermediate portion of the tubular housing and in electrical communication with the liquid discharge device, and a third electrical switch disposed within an upper portion of the tubular housing and in communication with a high level actuated device, each of the first, second, and third switches having an open state and a closed state;
    a first float movable along the tubular housing, wherein variation of a level of the surface of the liquid in the vessel past the first electrical switch causes motion of the first float past the first electrical switch and causes a change in state between the open state and the closed state of the first electrical switch, and wherein the location of the first indicium is at the level of the surface of the liquid causing the change in state of the first electrical switch;
    a second float movable along the tubular housing, wherein variation of the level of the surface of the liquid in the vessel past the second electrical switch causes motion of the second float past the second electrical switch and causes a change in state between the open state and the closed state of the second electrical switch, and wherein the location of the second indicium is at the level of the surface of the liquid causing the change in state of the second electrical switch, and further variation of the level of the surface of the liquid in the vessel past the third electrical switch causes motion of the second float past the third electrical switch and causes a change in state between the open state and the closed state of the third electrical switch, and wherein the location of the third indicium is at the level of the surface of the liquid causing the change in state of the third electrical switch;
    wherein movement of the first float to a level above the first electrical switch and movement of the second float to a level above the second electrical switch causes the liquid discharge device to discharge liquid from the vessel; and subsequently, movement of the second float to a level below the second electrical switch and movement of the first float to a level below the first electrical switch causes the liquid discharge device to cease discharging liquid from the vessel; and
    wherein movement of the second float to a level above the third electrical switch causes operation of the high level actuated device.

6. The apparatus of claim 5, wherein the liquid discharge device is a pump.

7. The apparatus of claim 5, wherein the high level actuated device is an alarm device.

8. The apparatus of claim 5, wherein the first electrical switch is operable by a magnetic force caused by motion of the first float past the first electric switch, the second electrical switch is operable by a magnetic force caused by motion of the second float past the second electric switch, and the third electrical switch is operable by a magnetic force caused by motion of the second float past the third electric switch.

9. The apparatus of claim 8, wherein the first, second, and third electrical switches are reed switches.

10. The apparatus of claim 9, wherein the first and second floats each contain a magnet.

11. A liquid level control module comprising:
  a) an external housing immersible through a surface of a liquid and into a bulk volume of the liquid, and comprised of a wall including a first indicium on an exterior surface of the wall and a passageway providing liquid communication between an interior of the external housing and an exterior of the external housing;
  b) a tubular housing contained within the external housing;
  c) a first electrical switch disposed within the tubular housing and having an open state and a closed state;
  d) a first float movable along the tubular housing, wherein variation of the level of the surface of the liquid past the first electrical switch causes motion of the first float past the first electrical switch and causes a change in state between the open state and the closed state of the first electrical switch, and wherein the location of the first indicium is at the level of the surface of the liquid causing the change in state of the first electrical switch.

12. The module of claim 11, wherein the first indicium is a bump formed on the exterior surface of the wall of the external housing.

13. The module of claim 11, further comprising a second indicium on the exterior surface of the wall of the external housing and a second electrical switch disposed within the tubular housing and having an open state and a closed state, and a second float movable along the tubular housing, wherein variation of the level of the surface of the liquid past the second electrical switch causes motion of the second float past the second electrical switch and causes a change in state between the open state and the closed state of the second electrical switch, and wherein the location of the second indicium is at the level of the surface of the liquid causing the change in state of the second electrical switch.

14. The module of claim 13, further comprising a third indicium on the exterior surface of the wall of the external housing and a third electrical switch disposed within the tubular housing and having an open state and a closed state, wherein further variation of the level of the surface of the liquid in the vessel past the third electrical switch causes motion of the second float past the third electrical switch and causes a change in state between the open state and the closed state of the third electrical switch, and wherein the location of the third indicium is at the level of the surface of the liquid causing the change in state of the third electrical switch.

\* \* \* \* \*